United States Patent
Seko

(10) Patent No.: US 10,836,325 B1
(45) Date of Patent: Nov. 17, 2020

(54) REMOVABLE DEVICE STAND

(71) Applicant: Honda Motor Co., Ltd., Tokyo (JP)

(72) Inventor: Shigeyuki Seko, Campbell, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/526,034

(22) Filed: Jul. 30, 2019

(51) Int. Cl.
*H04M 1/04* (2006.01)
*B60R 11/02* (2006.01)
*H04B 1/3877* (2015.01)
*B60R 11/00* (2006.01)

(52) U.S. Cl.
CPC ........ *B60R 11/0241* (2013.01); *H04B 1/3877* (2013.01); *B60R 2011/0026* (2013.01); *B60R 2011/0057* (2013.01)

(58) Field of Classification Search
CPC .... H04B 1/3877; H04M 1/04; B60R 11/0241; B60R 2011/0057; B60R 2011/0026
See application file for complete search history.

(56) References Cited

U.S. PATENT DOCUMENTS

| | | | |
|---|---|---|---|
| 2015/0162767 A1* | 6/2015 | Oh | G06F 1/1632 320/108 |
| 2015/0208826 A1 | 7/2015 | Yang et al. | |
| 2016/0176292 A1* | 6/2016 | Blaesing | G05G 5/03 335/219 |
| 2016/0318455 A1* | 11/2016 | Zhang | F16M 11/2007 |

FOREIGN PATENT DOCUMENTS

| | | | |
|---|---|---|---|
| CA | 2912329 A1 * | 11/2014 | H04M 1/04 |
| CN | 205610729 U | 9/2016 | |
| KR | 101062570 B1 | 9/2011 | |
| WO | 2012086908 A | 6/2012 | |

* cited by examiner

*Primary Examiner* — Tuan D Nguyen
(74) *Attorney, Agent, or Firm* — American Honda Motor Co., Inc.; Aaron C. Fong

(57) ABSTRACT

The systems and methods provided herein are directed to a stand for a mobile device. The stand may include an assembly of magnets, and a mirrored assembly of magnets are included in or attached to the mobile device. Some magnets in each assembly are reversed in polarity relative to other magnets. The assemblies have rotational symmetry of degree 4 so that the mobile device may be attached in any of the four cardinal orientations to the stand.

20 Claims, 6 Drawing Sheets

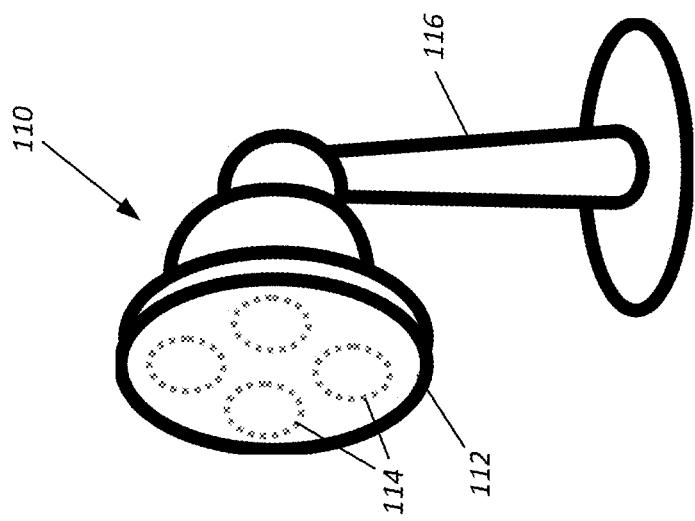
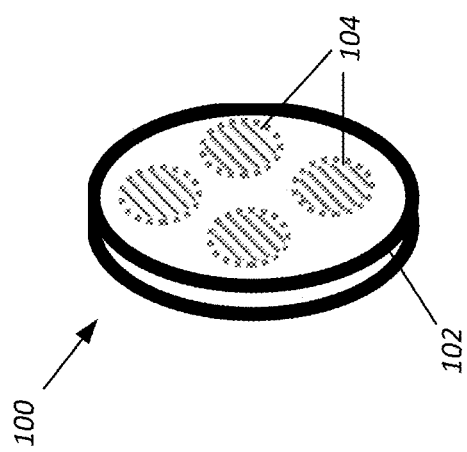
Fig. 1
PRIOR ART

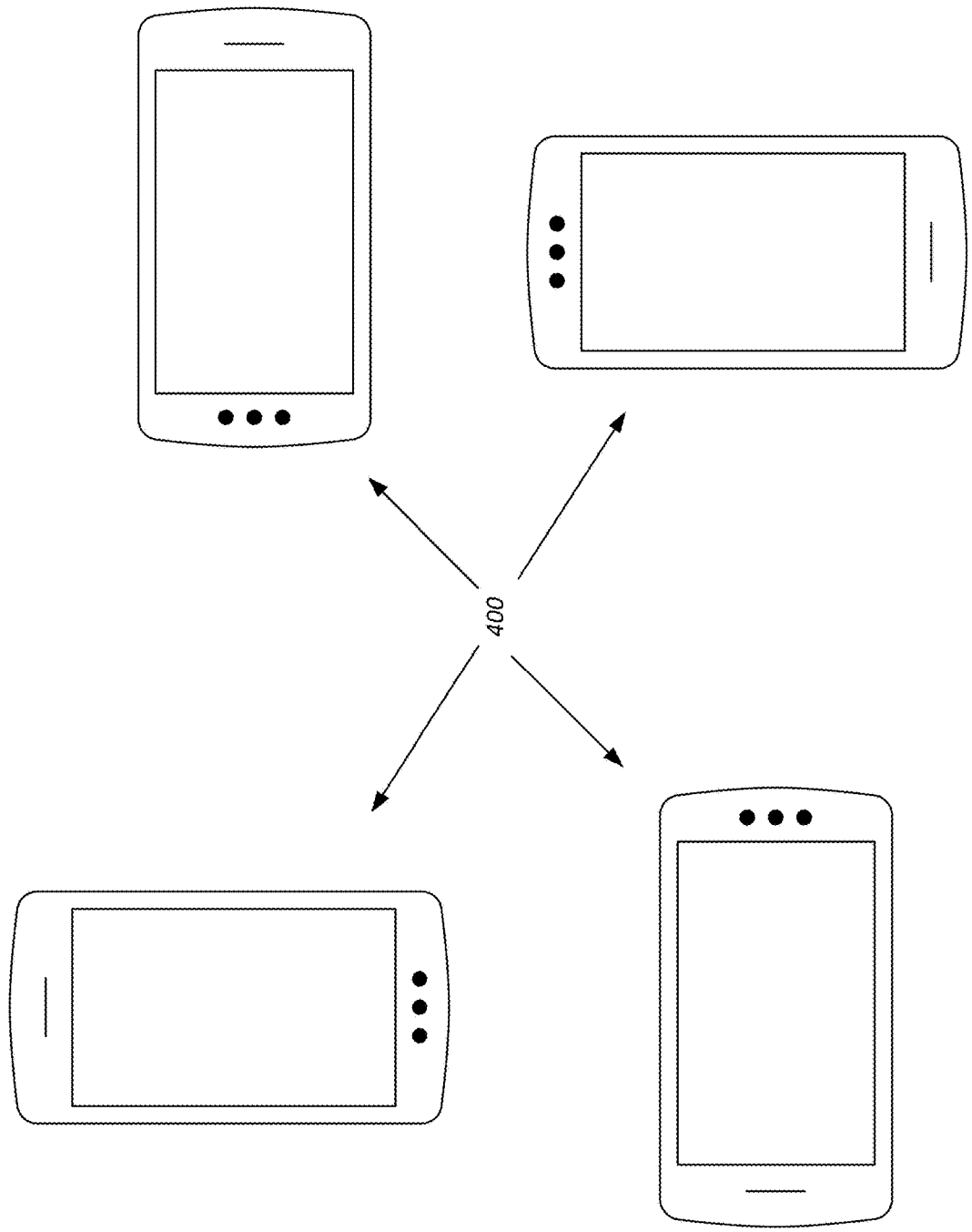

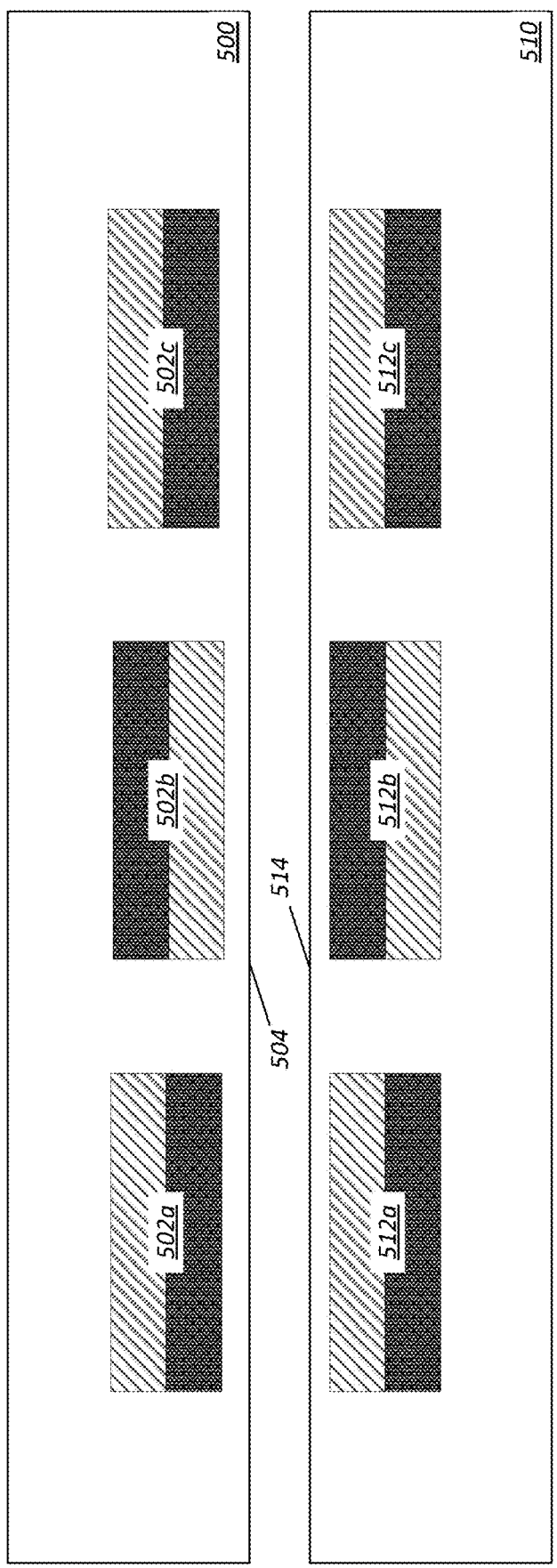

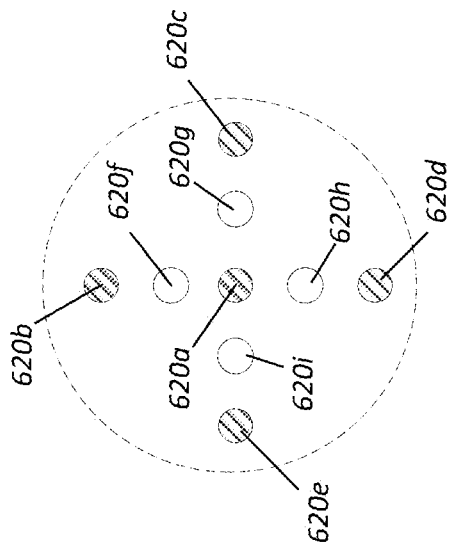
Fig. 6A
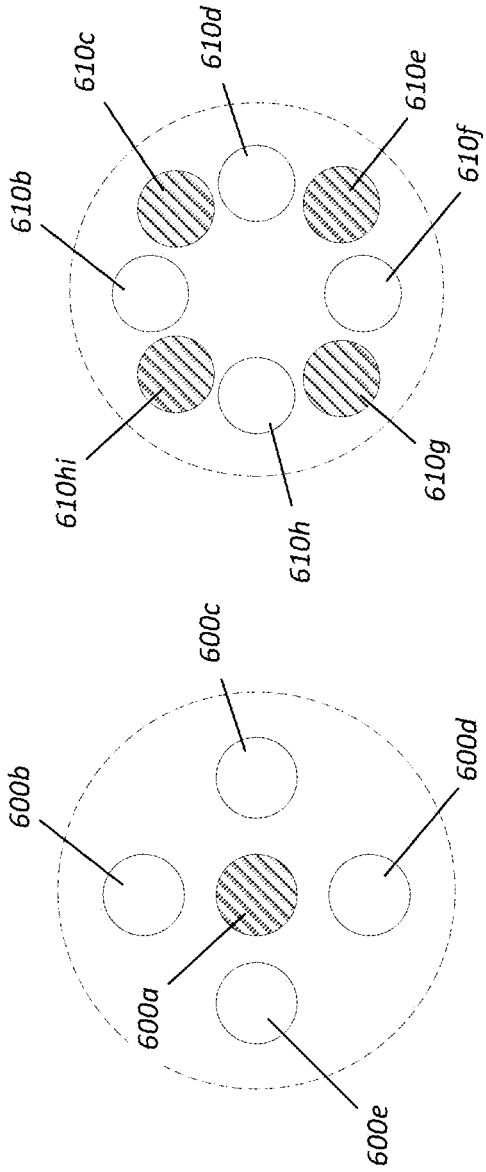
Fig. 6B
Fig. 6C
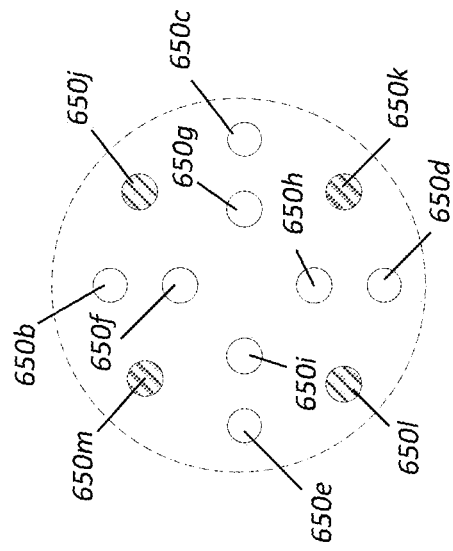
Fig. 6D
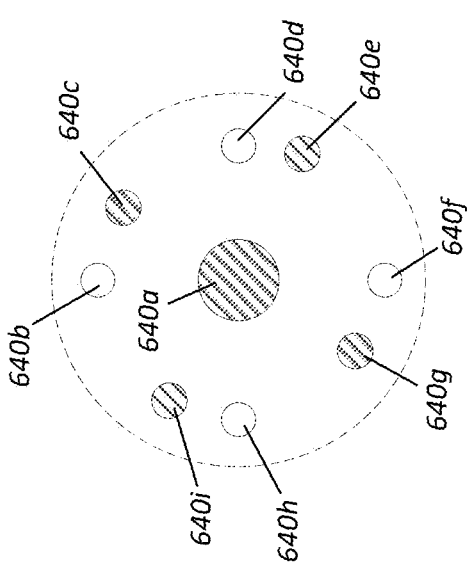
Fig. 6E
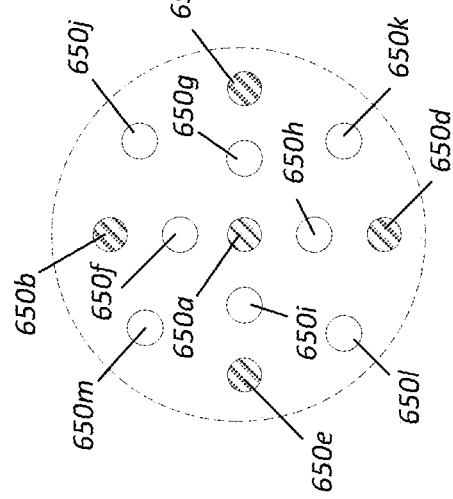
Fig. 6F

US 10,836,325 B1

REMOVABLE DEVICE STAND

BACKGROUND

The range of functions for mobile devices continue to increase as the devices themselves advance in sophistication and capability. Mobile devices may serve information, entertainment, communication, and productivity purposes, among others. As the uses broaden and applications promulgate, the mobile device's kinesthetics may become more important.

SUMMARY

According to one embodiment of the present disclosure, a magnetic attachment system for a mobile device is provided. The magnetic attachment system may include a mobile device assembly having a first plurality of magnets arranged along a plane in a symmetrical arrangement, the arrangement having rotational symmetry of order 4, magnetic poles of each of the first plurality of magnets disposed perpendicular to the plane of the symmetrical arrangement. The assembly may include a plate barrier configured such that it shields a mobile device from the plurality of magnets when interposed between the barrier and the plurality of magnets. The magnetic attachment system may include a stand assembly having a second plurality of magnets arranged along a plane in the same symmetrical arrangement as the first plurality of magnets, magnetic poles of each of the second plurality of magnets disposed perpendicular to the plane of the symmetrical arrangement. The first plurality of magnets may include a first subgroup containing one or more magnets with poles all aligned in a common direction and a second subgroup containing one or more magnets with poles all aligned opposite from those of the first subgroup. The arrangements of the magnets in the first and second subgroups may each have rotational symmetry of order 4. The polarities of the second plurality of magnets may mirror the polarities of the first plurality of magnets such that placing the mobile device assembly adjacent the stand assembly causes the magnets to couple in one of four different relative orientations at right angles.

According to another embodiment of the present disclosure, a system for a mobile device is provided. The system may include a mobile device assembly having a first plurality of magnets arranged along a plane in a symmetrical arrangement and a plate barrier configured such that it shields a mobile device from the plurality of magnets when interposed between the barrier and the plurality of magnets. In addition, the system may include a stand assembly having a second plurality of magnets arranged along a plane in the same symmetrical arrangement as the first plurality of magnets.

In accordance with yet another embodiment of the present disclosure, a magnetic attachment system is provided. The system may include a mobile device assembly having a first plurality of magnets arranged along a plane in a symmetrical arrangement and a plate barrier. In addition, the system may include a stand assembly comprising a second plurality of magnets arranged along a plane in the same symmetrical arrangement as the first plurality of magnets.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 1 illustrates a prior art magnetic attachment stand and device assembly;

FIG. 4 is an illustration of four exemplary mobile device orientations in accordance with one aspect of the present disclosure;

FIG. 5 is a cross-section view of layers containing an exemplary magnetic device assembly and a magnetic stand assembly in accordance with one aspect of the present disclosure; and FIGS. 6A-6F are schematic views of different exemplary magnetic assemblies in accordance with the present disclosure.

DESCRIPTION OF THE DISCLOSURE

Figure 2:
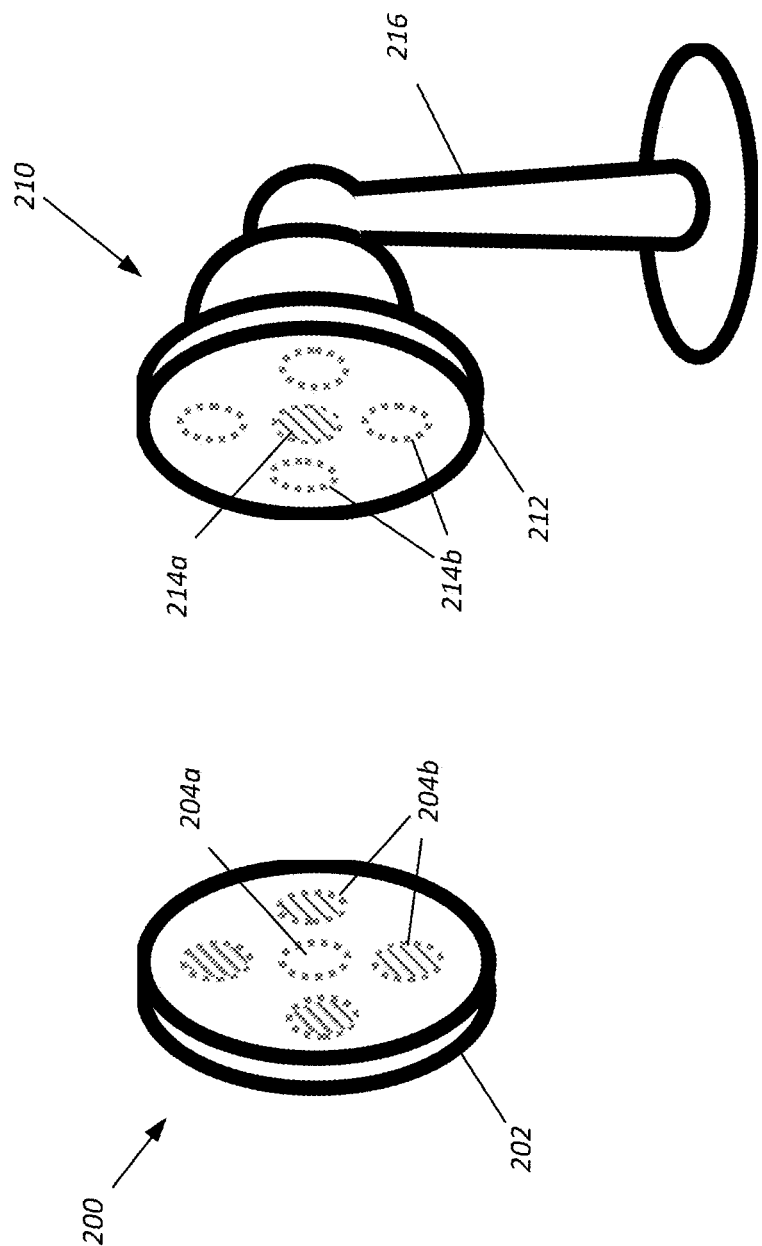
FIG. 2 illustrates an exemplary magnetic attachment stand and device assembly in accordance with one aspect of the present disclosure.

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

FIG. 1 illustrates a prior art magnetic attachment system including a mobile device assembly 100 and a stand assembly 110. The mobile device assembly 100 includes a solid casing 102 which is preferably made of a non-magnetic material such as plastic. The casing is affixed to the back of a mobile device (or a protective case) by, for example, an adhesive glue. The stand assembly 110 includes a similar casing 112, and is affixed to an arm 116 which may be configured to allow the casing 112 to be disposed in a variety of orientations. A socket joint is shown in FIG. 1, although other positionable arm mechanisms are used.

As shown, inside the mobile device assembly casing 102 may be a plurality of magnets 104. The magnets, which may be for example standard disk-shaped magnets having their north and south poles The polarity of the magnets is illustrated by their shading; that is, the shaded side of a magnet represents the opposite polarity from the unshaded side. Each of the magnets 104 within the mobile device assembly casing 102 has its polarity oriented in the same direction.

As shown, inside the stand assembly casing 112 is a plurality of magnets 114 which, as described above, are disc-shaped magnets with their north and south poles located along their flat sides. The unshaded side of the magnets is facing forward, denoting that the polarity of the side of the magnets 114 facing the visible surface of the chassis 112 is the opposite of the polarity for the side of the magnets 104 facing the visible surface of the chassis 102.

FIG. 2 illustrates an exemplary magnetic attachment system including a mobile device assembly 200 and a stand assembly 210, which differ from the assemblies described in FIG. 1 in that the pluralities of magnets are disposed differently. The mobile device assembly casing 202 may include a center magnet 204a with one pole facing the front surface, and peripheral magnets 204b with the opposite pole facing the front surface: that is, the peripheral magnets 204b are disposed to have reverse polarity to the center magnet 204a. Similarly, the stand assembly 210 includes (in addition to the arm 216) a casing 212 having a center magnet 214a and opposite-polarity peripheral magnets 214b. When the visible faces of the two assemblies are brought in proximity to each other, the center magnet 204a may attract the corresponding center magnet 214a and repel the peripheral magnets 214b. The peripheral magnets 204b will attract the corresponding peripheral magnets 214b and repel the center magnet 214a. As a consequence, the mobile device assembly 200 may be drawn into position such that the face of the mobile device assembly casing 200 may be properly centered on the face of the stand assembly casing 210. The stand assembly 210 may be affixed to a vehicle window, or the like, at a distal end from the casing 212.

Figure 3:
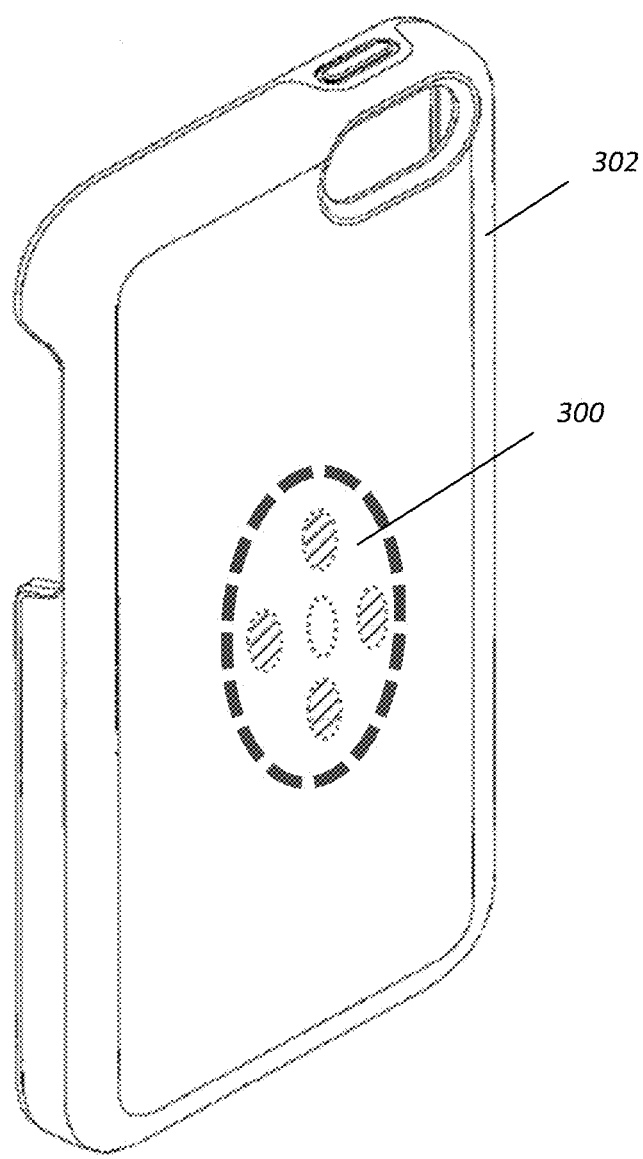
FIG. 3 is a perspective view of an exemplary mobile device case including a magnetic device assembly in accordance with one aspect of the present disclosure.

FIG. 3 shows a mobile device assembly 300 embedded in a mobile device case 302. Any configuration of magnets disclosed herein as appropriate for the assembly may be embedded in a case as shown. The assembly 300 may be embedded in the mobile device case 302 at its center, or other positions that are not directly in the center.

As illustrated by the views of FIG. 4, the assemblies described herein allow for the mobile device 400 attached to the mobile device case 302 to be affixed in one of four orientations in accordance with the radial symmetry of degree 4 of the plurality of magnets included in each assembly. From its initial upright configuration, the mobile device assembly may also fit onto the stand assembly when rotated 90°, 180°, or 270° each representing a quarter turn. Many mobile devices include display modes for these four configurations, and so the device may be mounted in any of them to reflect how the mobile device may be used. The mobile device 400 may adjust its screen depending on whether content is shown horizontally and/or longitudinally.

FIG. 5 illustrates a cross-section of two layers 500 and 510 each including a configuration of magnets according to the present disclosure. A first layer 500, which may be, for example, a mobile device case or adhered peripheral, includes an assembly with first, second, and three magnets 502a-c disposed therein. The center magnet 502b may be flipped relative to the other two magnets 502a and 502c. The pattern is mirrored by the three magnets 512a-c in the other layer 510, which may be a component of a removable stand as described herein. The surfaces 504 and 514 of the layers facing each other are drawn together by the magnets 502a-c, 512a-c when the layers are properly aligned.

FIG. 6A-F are schematics indicating magnet configurations in accordance with the present disclosure. Each of the illustrated configurations has radial symmetry of degree 4, and each configuration may include one or more magnets that is reversed, having its opposite pole facing the transverse surface of the configuration from that of the other magnets. As described herein, each such configuration may be mirrored in a second component so that corresponding magnets attract.

FIG. 6A shows the smallest configuration of magnets for which both of the above-mentioned properties are met. A center magnet 600a may be reversed relative to a set of four equally-spaced peripheral magnets 600b-e.

FIG. 6B illustrates a configuration of eight magnets positioned in a circle, without a center magnet (and, consequently no magnet labeled 610a). The magnets alternate polarity, so each of the magnets 610b, 610d, 610f, and 610h 610a, 610c, 610e, and 610g is adjacent to two magnets that are reversed relative to them, magnets 610c, 610e, 610g and 610i.

FIG. 6C illustrates a configuration of nine magnets. A central magnet 620a is shown with the same polarity as four peripheral magnets 600b-e, while intermediate magnets 620f-i of reversed polarity are placed between the central magnet and each peripheral magnet. FIG. 6D shows a similar configuration with 630a-i having the same relative position and polarity as 620a-i in FIG. 6C, but with the addition of four more peripheral magnets 630j-m having the same polarity as the intermediate magnets 630f-i.

The arrangement shown in FIG. 6E illustrates that the magnetic configuration need not be bilaterally symmetric. Around the central magnet 640a are four pairs of smaller magnets 640b-i. Each pair consists of magnets of opposite polarity rather than the magnets being equidistant around the periphery. The use of different magnet sizes may also facilitate a more accurate attachment location in some implementations.

FIG. 6F illustrates another example of an arrangement without a central magnet (and consequently no magnet labeled 650a). As in FIG. 6D, eight magnets evenly spaces around the periphery with alternating polarities, magnets 650b-e having the same orientation but opposite from magnets 650j-m. Intermediate magnets 650f-i are positioned radially inwards and adjacent to magnets 650b-e of the same polarity.

The foregoing description is provided to enable any person skilled in the relevant art to practice the various embodiments described herein. Various modifications to these embodiments will be readily apparent to those skilled in the relevant art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A magnetic attachment system for a mobile device comprising:
   a mobile device assembly comprising:
      a first center magnet on a plane;
      a first plurality of magnets arranged on the plane in a symmetrical arrangement around the first center magnet, the arrangement having rotational symmetry of order 4, magnetic poles of each of the first plurality of magnets disposed perpendicular to the plane of the symmetrical arrangement;

a plate barrier configured such that it shields a mobile device from the first plurality of magnets when interposed between the barrier and the first plurality of magnets; and
a stand assembly comprising:
  a second center magnet on a plane;
  a second plurality of magnets arranged on the plane in the same symmetrical arrangement as the first plurality of magnets around the second center magnet, magnetic poles of each of the second plurality of magnets disposed perpendicular to the plane of the symmetrical arrangement;
wherein the first plurality of magnets comprises a first subgroup containing one or more magnets with poles all aligned in a common direction and a second subgroup containing one or more magnets with poles all aligned opposite from those of the first subgroup;
wherein the arrangements of the magnets in the first and second subgroups each have rotational symmetry of order 4;
wherein the first center magnet contains a pole opposite from the second center magnet;
wherein the polarities of the second plurality of magnets mirror the polarities of the first plurality of magnets such that placing the mobile device assembly adjacent the stand assembly causes the magnets to couple in one of four different relative orientations at right angles.

2. The magnetic attachment system of claim 1, wherein the first subgroup of the first plurality of magnets is a single magnet positioned at the point of symmetry for the symmetrical arrangement, and wherein the second subgroup comprises four magnets disposed evenly around the point of symmetry.

3. The magnetic attachment system of claim 1, wherein the first subgroup of the first plurality of magnets includes a single magnet positioned at the point of symmetry for the symmetrical arrangement and a plurality of magnets disposed evenly around the point of symmetry, and wherein the second subgroup comprises a plurality of magnets disposed evenly around the point of symmetry.

4. The magnetic attachment system of claim 1, wherein the stand assembly is affixed to a vehicle window.

5. A system for a mobile device comprising:
a mobile device assembly comprising a first plurality of magnets arranged along a plane in a symmetrical arrangement and a plate barrier configured such that it shields a mobile device from the plurality of magnets when interposed between the barrier and the plurality of magnets, wherein a first center magnet is disposed on the plane with the first plurality of magnets; and
a stand assembly comprising a second plurality of magnets arranged along a plane in the same symmetrical arrangement as the first plurality of magnets, wherein a second center magnet is disposed on the plane with the second plurality of magnets.

6. The system of claim 5, wherein the first plurality of magnets on the mobile device assembly are arranged in a rotational symmetry of order 4.

7. The system of claim 6, wherein magnetic poles of each of the first plurality of magnets on the mobile device assembly are disposed perpendicular to the plane of the symmetrical arrangement.

8. The system of claim 5, wherein magnetic poles of each of the second plurality of magnets are disposed perpendicular to the plane of the symmetrical arrangement.

9. The system of claim 5, wherein the first plurality of magnets comprises a first subgroup containing one or more magnets with poles all aligned in a common direction and a second subgroup containing one or more magnets with poles all aligned opposite from those of the first subgroup.

10. The system of claim 9, wherein the arrangements of the magnets in the first and second subgroups each have rotational symmetry of order 4.

11. The system of claim 5, wherein the polarities of the second plurality of magnets mirror the polarities of the first plurality of magnets such that placing the mobile device assembly adjacent the stand assembly causes the magnets to couple in one of four different relative orientations at right angles.

12. The system of claim 5, wherein the stand assembly is affixed to a vehicle window.

13. A magnetic attachment system comprising:
a mobile device assembly comprising a first plurality of magnets arranged along a plane in a symmetrical arrangement and a plate barrier, wherein a first center magnet is disposed on the plane with the first plurality of magnets; and
a stand assembly comprising a second plurality of magnets arranged along a plane in the same symmetrical arrangement as the first plurality of magnets, wherein a second center magnet is disposed on the plane with the second plurality of magnets.

14. The magnetic attachment system of claim 13, wherein the plate barrier is configured such that it shields a mobile device from the plurality of magnets when interposed between the barrier and the plurality of magnets.

15. The magnetic attachment system of claim 13, wherein the first plurality of magnets on the mobile device assembly are arranged in a rotational symmetry of order 4.

16. The magnetic attachment system of claim 13, wherein magnetic poles of each of the first plurality of magnets on the mobile device assembly are disposed perpendicular to the plane of the symmetrical arrangement.

17. The magnetic attachment system of claim 13, wherein magnetic poles of each of the second plurality of magnets are disposed perpendicular to the plane of the symmetrical arrangement.

18. The magnetic attachment system of claim 13, wherein the first plurality of magnets comprises a first subgroup containing one or more magnets with poles all aligned in a common direction and a second subgroup containing one or more magnets with poles all aligned opposite from those of the first subgroup.

19. The magnetic attachment system of claim 18, wherein the arrangements of the magnets in the first and second subgroups each have rotational symmetry of order 4.

20. The magnetic attachment system of claim 18, wherein the polarities of the second plurality of magnets mirror the polarities of the first plurality of magnets such that placing the mobile device assembly adjacent the stand assembly causes the magnets to couple in one of four different relative orientations at right angles.

* * * * *